US012466044B2

(12) United States Patent
Schneider et al.

(10) Patent No.: US 12,466,044 B2
(45) Date of Patent: Nov. 11, 2025

(54) STAPLING DEVICE

(71) Applicant: LEITZ ACCO Brands GmbH & Co KG, Stuttgart (DE)

(72) Inventors: Thomas Schneider, Leonberg (DE); Ulrich Schneider, Stuttgart (DE); Kurt Leute, Blumberg (DE); Ou Cui, Stuttgart (DE)

(73) Assignee: LEITZ ACCO Brands GmbH & Co KG, Stuttgart (DE)

( * ) Notice: Subject to any disclaimer, the term of this patent is extended or adjusted under 35 U.S.C. 154(b) by 0 days.

(21) Appl. No.: 18/682,287

(22) PCT Filed: Aug. 29, 2022

(86) PCT No.: PCT/EP2022/073928
§ 371 (c)(1),
(2) Date: Feb. 8, 2024

(87) PCT Pub. No.: WO2023/031109
PCT Pub. Date: Mar. 9, 2023

(65) Prior Publication Data

US 2024/0278402 A1 Aug. 22, 2024

(30) Foreign Application Priority Data

Aug. 30, 2021 (DE) ..................... 10 2021 122 348.2

(51) Int. Cl.
*B25C 5/02* (2006.01)
*B25C 5/15* (2006.01)

(52) U.S. Cl.
CPC .......... *B25C 5/0228* (2013.01); *B25C 5/0242* (2013.01); *B25C 5/15* (2013.01)

(58) Field of Classification Search
CPC ........ B25C 5/0228; B25C 5/0242; B25C 5/15
(Continued)

(56) References Cited

U.S. PATENT DOCUMENTS 1,459,924 A 6/1923 Obstfeld
1,704,507 A 3/1929 Kuch, Jr.
(Continued)

OTHER PUBLICATIONS

Translation of International Search Report for Application No. PCT/EP2022/073928 dated Nov. 15, 2022 (2 pages).
(Continued)

*Primary Examiner* — Thanh K Truong
*Assistant Examiner* — Xavier A Madison
(74) *Attorney, Agent, or Firm* — Michael Best & Friedrich LLP

(57) ABSTRACT

A stapling device includes an anvil leg, an anvil plate, a staple magazine, which can be pivoted relative to the anvil leg about a transverse axis, a driver for carrying out stapling through a gap at the front end of the staple magazine, and an actuation apparatus for acting upon the driver toward the anvil plate. The actuation apparatus has a solenoid and a striking pin for acting upon a driver anvil fixedly connected to the driver, the striking pin being movable by the solenoid. Between the gap and the transverse axis, the staple magazine is supported on the anvil leg by a magazine spring. The magazine spring is configured such that the staple magazine rests on the anvil leg or on the anvil plate due to a force of gravity acting on the staple magazine and overcoming a spring force of the magazine spring.

12 Claims, 4 Drawing Sheets

(58) Field of Classification Search
USPC .......................................................... 227/131
See application file for complete search history.

(56) References Cited

U.S. PATENT DOCUMENTS

| | | | | |
|---|---|---|---|---|
| 2,957,174 | A * | 10/1960 | Oussani ................ | B25C 5/0228<br>D8/49 |
| 4,940,177 | A | 7/1990 | Jimena | |
| 6,135,337 | A * | 10/2000 | Harris ................... | B25C 5/0228<br>227/7 |
| 2021/0205970 | A1 * | 7/2021 | Menoni ................. | B25C 5/0228 |

OTHER PUBLICATIONS

German Patent Office Action for Application No. 102021122348.2 dated Aug. 4, 2022 (6 pages including statement of relevance).
International Preliminary Report on Patentability for Application No. PCT/EP2022/073928 dated Mar. 5, 2024 (6 pages).

* cited by examiner

STAPLING DEVICE

BACKGROUND

The invention relates to a stapling device in accordance with the disclosure.

Stapling devices of this kind, which are also referred to as magnetic stapling devices, are distinguished by the fact that the staples are not driven through the sheet material to be stapled by pressing the driver down manually but by the action of the actuation apparatus on the driver. During the stapling process, the striking pin is pulled into the solenoid by energization of the latter and, in the process, acts by means of an actuating element on the driver anvil, with the result that the driver is moved downward abruptly and drives the forwardmost staple in the staple magazine through the gap, thus enabling it to penetrate the sheet material resting on the anvil. The movement of the driver takes place against the restoring force of a driver spring. The staple magazine is furthermore supported on the anvil leg by means of a magazine spring, wherein the magazine spring is made weaker than the driver spring. Thus, during the stapling process, the staple magazine is first of all pressed onto the anvil by means of its front end having the gap before the driver is moved downward.

It is generally perceived as a disadvantage of such previously known magnetic stapling devices that loud noises occur during the stapling process. These occur particularly when the staple magazine strikes the anvil plate or the sheet material resting on the anvil plate.

SUMMARY

It is therefore the object of the invention to develop a stapling device of the type stated at the outset in such a way that the stapling process causes less noise.

According to the invention, this object is achieved by a stapling device having the features of the disclosure.

The invention is based on the concept of at least to a large extent avoiding the noise which occurs when the staple magazine strikes the sheet material by virtue of the fact that the staple magazine is already resting on the anvil leg or on the anvil plate when the stapling process is initiated. It is then no longer struck against the anvil plate or the anvil leg at high speed by the force of the striking pin but is at most moved a little further toward the anvil. While the staple magazine rests on the anvil leg or on the anvil plate in the state of rest, that is to say in the absence of external forces, it can also be raised by a certain amount, in particular to insert sheet material between the staple magazine and the anvil plate.

It is expedient if, on its underside facing the anvil leg, the staple magazine has a spacer, which, in the absence of external forces, rests on the anvil leg or on the anvil plate. The staple magazine then does not rest directly by means of its base on the anvil leg or the anvil plate but by means of the spacer. This can be a plate which extends between the gap and the transverse axis over part of the length of the staple magazine. According to one advantageous exemplary embodiment, the spacer is elastically compressible, and is manufactured from rubber, for example. This embodiment is advantageous particularly when the gap is arranged at a distance above the anvil plate in the absence of external forces, e.g. in order to facilitate the insertion of sheet material between the anvil plate and the staple magazine. It is then possible, for example, to lower the gap by compressing the spacer onto the anvil plate. Since the spacer is already resting on the anvil leg or the anvil plate when the stapling process is initiated, the noisy impact of the staple magazine on the anvil leg or the anvil plate is avoided.

It is expedient if the stapling device has an insertion aid for the insertion of sheet material between the staple magazine and the anvil plate, which insertion aid has an oblique surface which slopes down toward the rear. The insertion aid makes it easier to insert sheet material without having to raise the staple magazine specifically for this purpose.

According to a first embodiment, the insertion aid is secured on the staple magazine and projects forward from the latter. The insertion aid can be embodied as a wire hoop or as a plastic part, for example. In the first embodiment, it is expedient if it can be raised with respect to the staple magazine against a restoring force. It is furthermore possible for the stapling device to have a hood, which covers the staple magazine and accommodates the actuation apparatus, thus minimizing the risk that a user will insert a finger between the staple magazine and the anvil plate and be injured during the stapling process. On its front side, the hood can have a flap which can be pivoted to a limited extent, which covers the insertion aid in a first end position and exposes the insertion aid in a second end position.

According to a second embodiment, the insertion aid is formed by an obliquely downward- and rearward-sloping surface of the hood which covers the staple magazine and accommodates the actuation apparatus. In the second embodiment, it is preferred that the hood does not have a pivotable flap but always covers the staple magazine completely.

BRIEF DESCRIPTION OF THE DRAWINGS

The invention is explained in greater detail below with reference to two exemplary embodiments illustrated schematically in the drawing. In the drawing.

DETAILED DESCRIPTION

Figure 1:
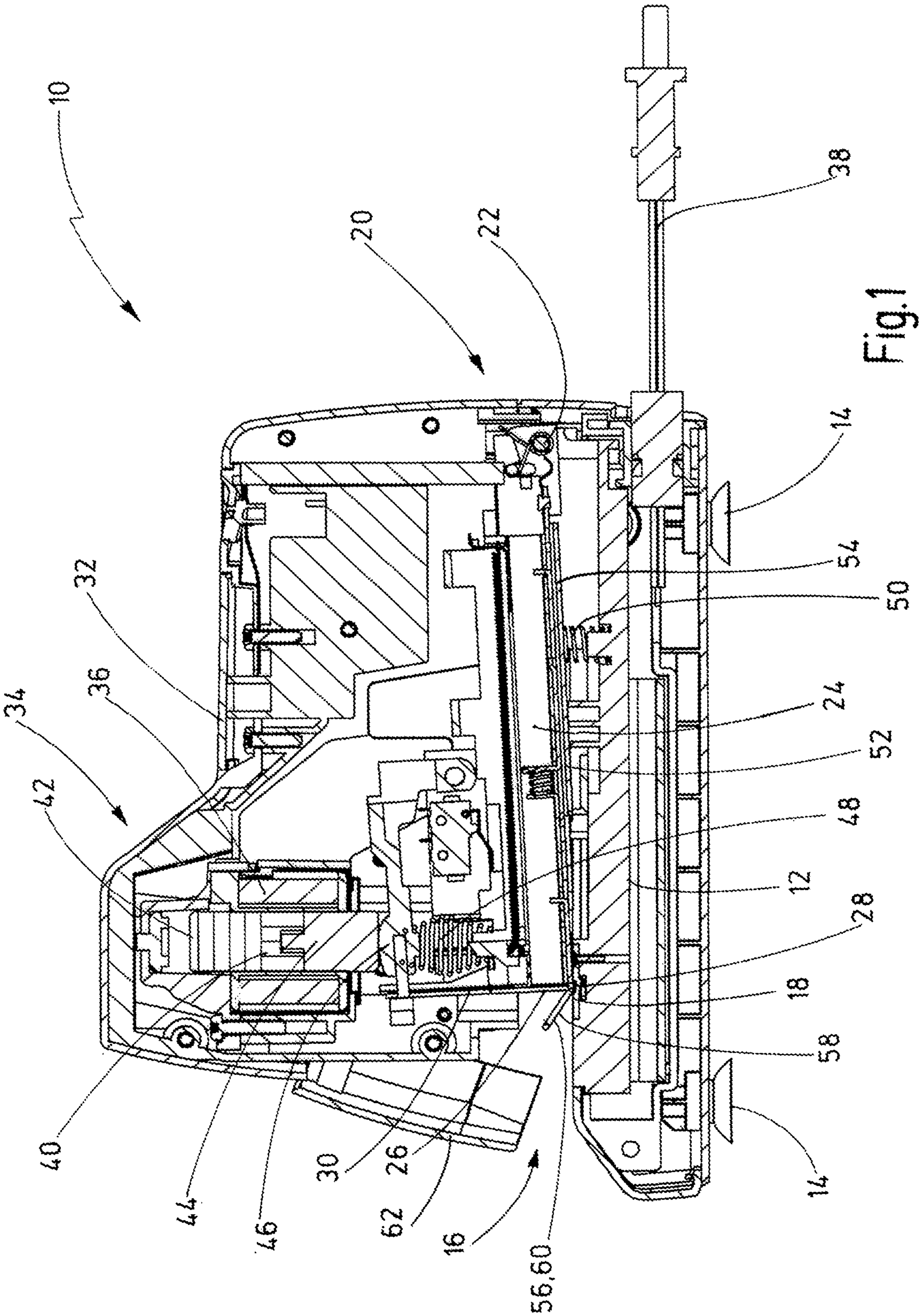
FIGS. 1, 2 show a stapling device in longitudinal section according to a first exemplary embodiment, in a rest position and with the staple magazine raised.
Figure 2:
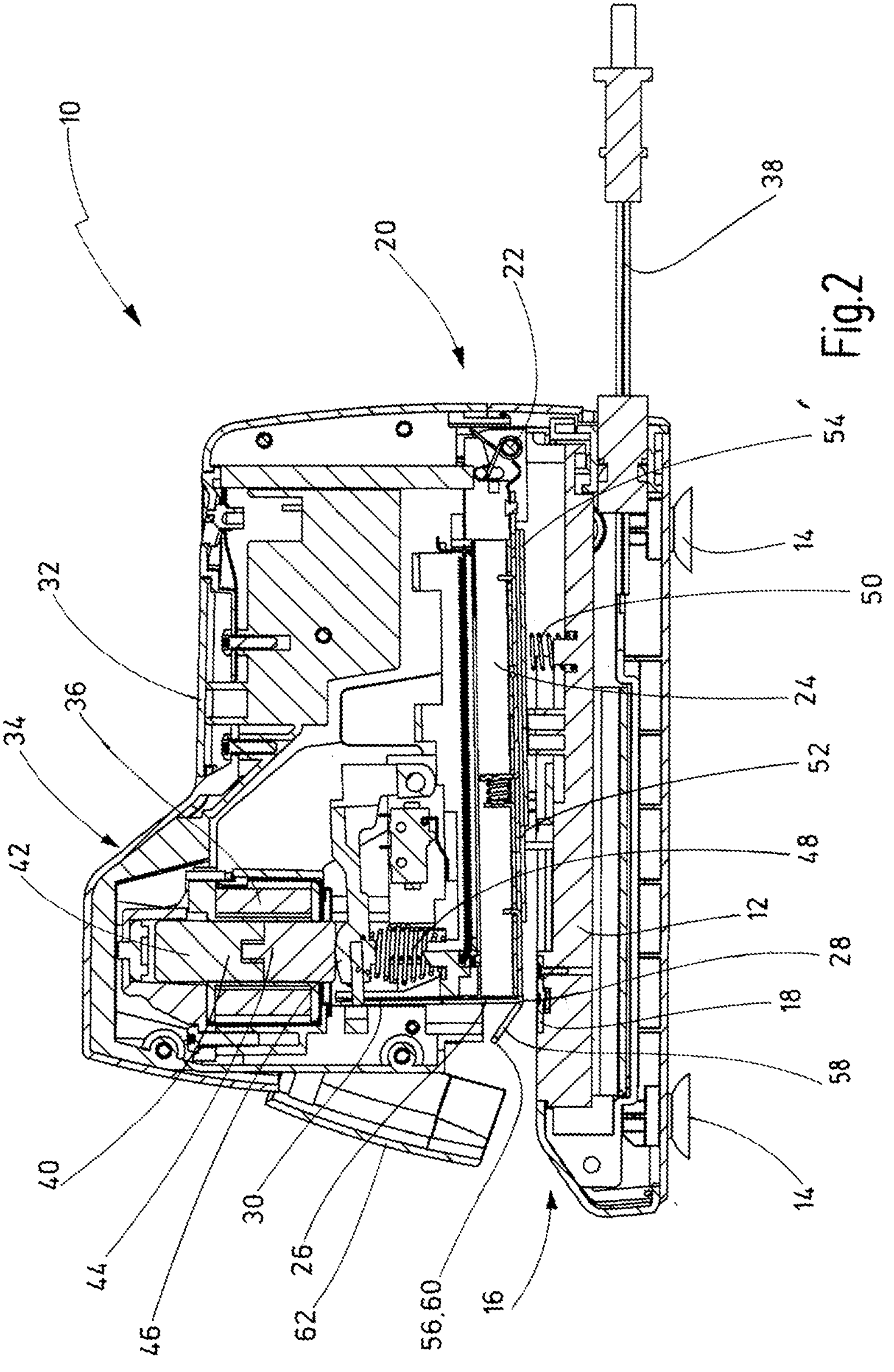
Figure 3:
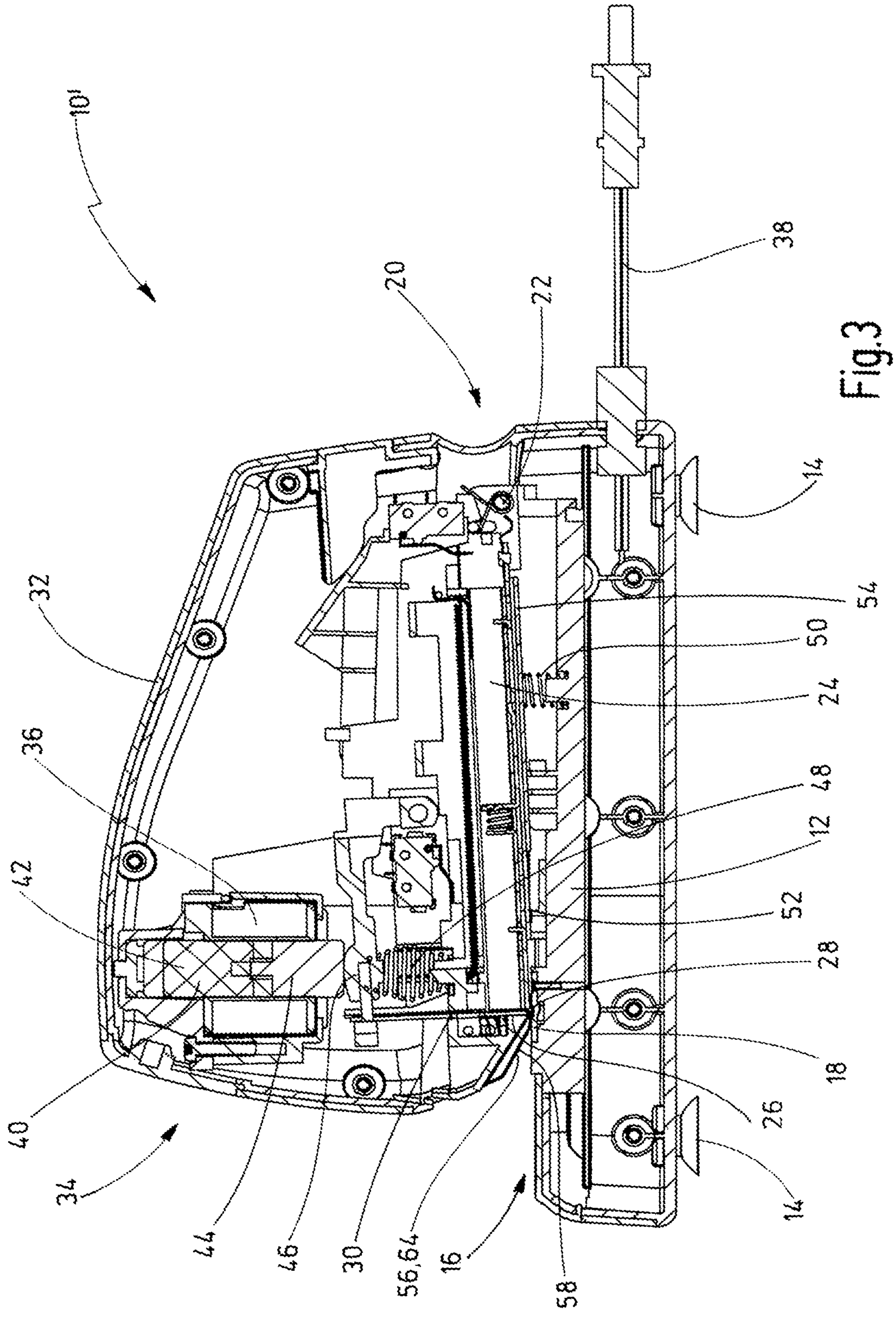
FIGS. 3, 4 show a stapling device according to a second exemplary embodiment in longitudinal section, in a rest position and with the staple magazine raised.
Figure 4:
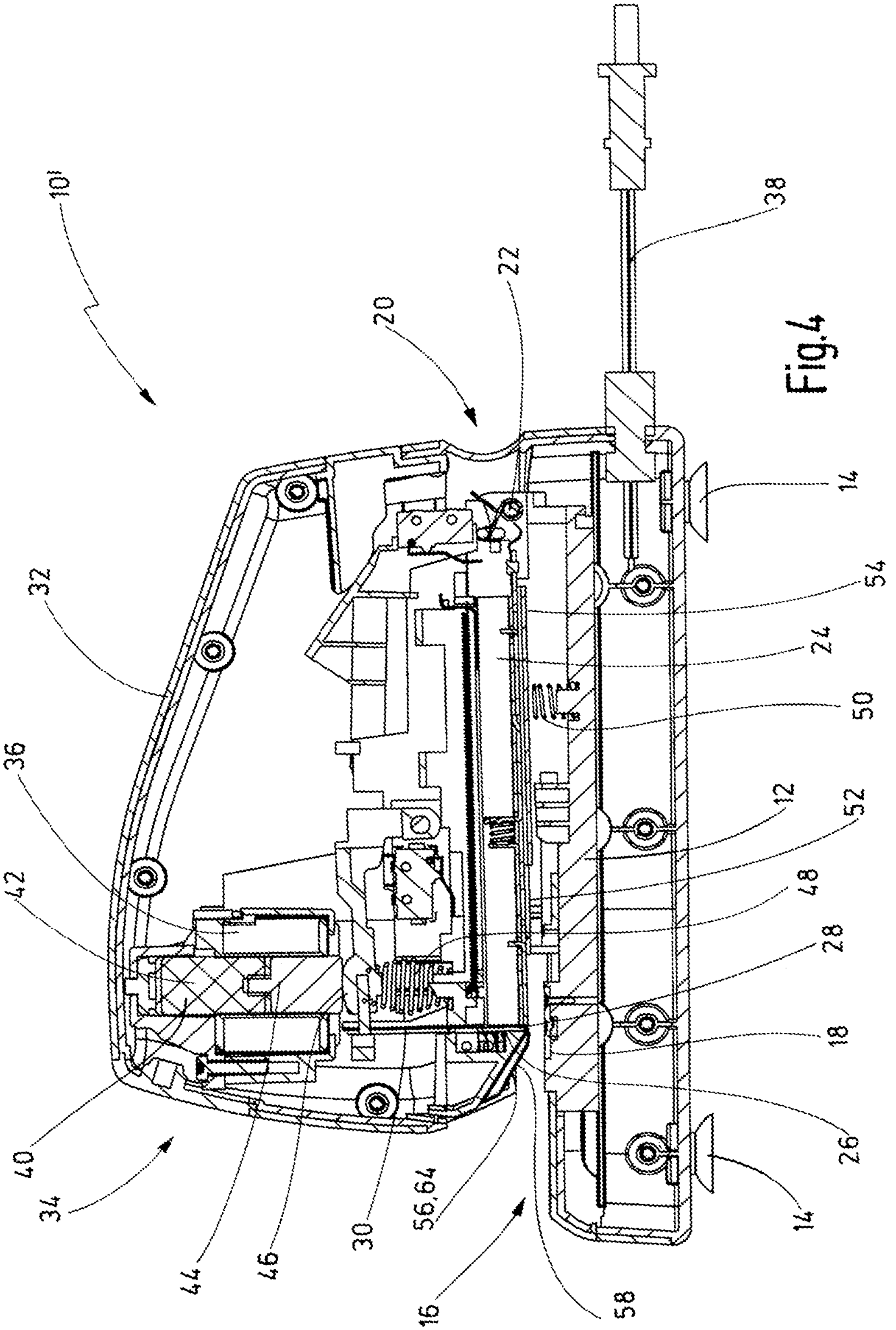

The stapling device 10 according to the first exemplary embodiment, which is illustrated in FIGS. 1 and 2, like the stapling device 10' according to the second exemplary embodiment, which is illustrated in FIGS. 3 and 4, has an anvil leg 12, on the underside of which feet 14 for placement on a surface, e.g. a table top, are arranged, and in the front region 16 of which there is arranged, on the upper side facing away from the underside, an anvil plate 18, which has forming contours for the purpose of forming staple legs. Arranged in the rear region 20 of the anvil leg 12 is a transverse axis 22, about which a staple magazine 24 is mounted so as to be pivotable to a limited extent relative to the anvil leg 12. At its front end 26, the staple magazine 24 has, on its underside facing the anvil leg 12, a gap 28, through which the respective forwardmost staple of the staples held in the staple magazine 24 can be passed, and driven through sheet material to be stapled resting on the anvil plate 18, by means of a vertically movable driver 30.

The stapling device 10, 10' furthermore has a hood 32, which is connected to the anvil leg 12 and covers the staple magazine 24. Also accommodated in the hood 32 is the driver 30, together with an actuation apparatus 34. This apparatus has a solenoid 36, which is supplied with power via a connection cable 38. A striking pin 40 is mounted in the solenoid 36 in such a way that it can be moved substantially in the vertical direction, and said striking pin has a magnet portion 42, which projects upward out of the solenoid 36 and comprises a ferromagnetic material, and a striking portion 44 made of plastic, which projects downward from the solenoid 36. Arranged below the striking pin 40 is a driver anvil 46, which is fixedly connected to the driver 30 and is supported by means of a driver spring 48 in the form of a compression spring on the staple magazine 24. When the solenoid 36 is energized, the magnet portion 42 is pulled abruptly into the solenoid, with the result that the striking portion 44 strikes the driver anvil 46 and urges the driver 30 abruptly downward against the force of the driver spring 48. The driver 30 then acts upon the staple arranged furthest forward in the staple magazine 24, with the result that said staple is passed through the gap 28, is driven through the sheet material resting on the anvil plate 18 and is formed in the forming contours.

The staple magazine 24 is supported on the anvil leg 12 by means of a magazine spring 50, which is likewise designed as a compression spring. In this case, the magazine spring 50 is made significantly weaker than the driver spring 48 and has a significantly lower spring constant. It is arranged between the front end 26 and the transverse axis 22 and is dimensioned in such a way that it cannot hold the staple magazine 24 suspended over the anvil leg 12. In the rest position shown in FIGS. 1 and 3, in which no external forces act on the stapling device 10, the staple magazine 24 rests by means of a spacer 54 in the form of a rubber plate arranged on its underside 52 on the anvil leg 12. In this case, the spacer 54 is arranged between the gap 28 and the transverse axis 22, and therefore the gap 28 is held at a short distance above the anvil plate 18 in the rest position. When the actuation apparatus 34 is actuated by energizing the solenoid 36, the spacer 54 is first of all compressed, and the magazine spring 50 is shortened further by a certain amount until the front end 26 of the staple magazine 24 rests on the anvil plate 18 or on the sheet material resting on the anvil plate 18. Since no further downward movement of the staple magazine 24 is then possible, the driver 30 is moved downward against the restoring force of the driver spring 48, and the sheet material is stapled together. The stapling devices 10, 10' according to the two exemplary embodiments are identical in respect of the features described above and of the mode of operation resulting from these features. To provide a better illustration of their mode of operation, they are furthermore illustrated with the staple magazine 24 raised in FIGS. 2 and 4.

The stapling devices 10, 10' according to the two exemplary embodiments furthermore each have an insertion aid 56 with an oblique surface 58 which slopes down obliquely rearward toward the anvil leg 12 and facilitates the insertion of sheet material under the gap 28. In the case of the stapling device 10 according to the first exemplary embodiment, the oblique surface 58 is formed by a wire hoop 60, which is secured on the front end 26 of the staple magazine 24 and is likewise arranged under the hood 32. Here, the hood 32 has on its front side a flap 62 which can be pivoted to a limited extent, covers the wire hoop 60 in a first end position and exposes it in a second end position, which is illustrated in FIGS. 1 and 2. When the flap 62 is moved out of its first end position, a switch (not illustrated in the drawing) is actuated and prevents energization of the solenoid 36, ensuring that a person who reaches under the wire hoop 60 cannot be injured by the accidental initiation of a stapling process. In the case of the stapling device 10' according to the second exemplary embodiment, in contrast, the oblique surface 58 is formed by a front surface 64 of the hood 32.

In summary, the following may be stated: the invention relates to a stapling device 10, 10' comprising an anvil leg 12, which bears, in its front region 16, an anvil plate 18, a staple magazine 24, which can be pivoted to a limited extent relative to the anvil leg 12 about a transverse axis 22 arranged in the rear region 20 of the anvil leg 12, a driver 30 for passing staples through a gap 28 at the front end 26 of the staple magazine 24, said gap being arranged above the anvil plate 18, and an actuation apparatus 34 for acting upon the driver 30 toward the anvil plate 18 against the restoring force of a driver spring 48, wherein the actuation apparatus 34 has a solenoid 36 and a striking pin 40 for acting upon a driver anvil 46 fixedly connected to the driver 30, the striking pin being movable by means of the solenoid 36, and wherein, between the gap 28 and the transverse axis 22, the staple magazine 24 is supported on the anvil leg 12 by means of a magazine spring 50. According to the invention, it is envisaged that the magazine spring 50 is dimensioned in such a way that, in the absence of external forces, the staple magazine 24 rests on the anvil leg 12 or on the anvil plate 18.

What is claimed is:

1. A stapling device comprising an anvil leg (12) having an anvil plate (18) at a front region (16) of the anvil leg (12), a staple magazine (24), which is pivotable to a limited extent relative to the anvil leg (12) about a transverse axis (22) arranged in a rear region (20) of the anvil leg (12), a driver (30) for passing staples through a gap (28) at a front end (26) of the staple magazine (24), said gap being arranged above the anvil plate (18), and an actuation apparatus (34) for acting upon the driver (30) toward the anvil plate (18) against a restoring force of a driver spring (48), wherein the actuation apparatus (34) has a solenoid (36) and a striking pin (40) for acting upon a driver anvil (46) fixedly connected to the driver (30), the striking pin being movable by the solenoid (36), and wherein, between the gap (28) and the transverse axis (22), the staple magazine (24) is supported on the anvil leg (12) by a magazine spring (50), wherein the magazine spring (50) is configured such that the staple magazine (24) rests on the anvil leg (12) or on the anvil plate (18) due to a force of gravity acting on the staple magazine (24) and overcoming a spring force of the magazine spring (50).

2. The stapling device as claimed in claim 1, wherein, on an underside (52) facing the anvil leg (12), the staple magazine (24) has a spacer (54), which, in the absence of external forces, rests on the anvil leg (12) or the anvil plate (18).

3. The stapling device as claimed in claim 2, wherein the spacer (54) is a plate which extends between the gap (28) and the transverse axis (22) over part of a length of the staple magazine (24).

4. The stapling device as claimed in claim 2, wherein the spacer (54) is elastically compressible.

5. The stapling device as claimed in claim 4, wherein the gap (28) is lowered by compressing the spacer (54) onto the anvil plate (18).

6. The stapling device as claimed in claim 1, wherein, in the absence of external forces, the gap (28) is arranged at a distance above the anvil plate (18).

7. The stapling device as claimed in claim 1, further comprising an insertion aid (56) for insertion of sheet material between the staple magazine (24) and the anvil plate (18), which insertion aid has an oblique surface (58) which slopes down toward the rear region.

8. The stapling device as claimed in claim 7, wherein the insertion aid (56) is secured on the staple magazine (24) and projects forward from the staple magazine (24).

9. The stapling device as claimed in claim 8, wherein the insertion aid (56) is raised with respect to the staple magazine (24) against a restoring force.

10. The stapling device as claimed in claim 7, further comprising a hood (32), which covers the staple magazine (24) and accommodates the actuation apparatus (34) and wherein the insertion aid (56) is formed by a surface (64) of the hood (32) which slopes obliquely down toward the rear region.

11. The stapling device as claimed in claim 1, further comprising a hood (32), which covers the staple magazine (24) and accommodates the actuation apparatus (34).

12. The stapling device as claimed in claim 11, wherein, on a front side, the hood (32) has a flap (62) which is pivotable to a limited extent, which covers the insertion aid (56) in a first end position and exposes the insertion aid (56) in a second end position.

* * * * *